(12) United States Patent
Bastide et al.

(10) Patent No.: US 9,460,108 B2
(45) Date of Patent: Oct. 4, 2016

(54) FILENAME-BASED INFERENCE OF REPOSITORY ACTIONS

(71) Applicant: International Business Machines Corporation, Armonk, NY (US)

(72) Inventors: Paul R. Bastide, Boxford, MA (US); Matthew E. Broomhall, Goffstown, NH (US); Daniel B. Harris, Andover, MA (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 314 days.

(21) Appl. No.: 13/948,745

(22) Filed: Jul. 23, 2013

(65) Prior Publication Data

US 2015/0026226 A1 Jan. 22, 2015

Related U.S. Application Data

(63) Continuation of application No. 13/942,769, filed on Jul. 16, 2013.

(51) Int. Cl.
*G06F 7/00* (2006.01)
*G06F 17/30* (2006.01)

(52) U.S. Cl.
CPC ..... *G06F 17/30194* (2013.01); *G06F 17/3012* (2013.01); *G06F 17/30123* (2013.01); *G06F 17/30221* (2013.01)

(58) Field of Classification Search
CPC ............ G06F 17/30123; G06F 17/3012
See application file for complete search history.

(56) References Cited

U.S. PATENT DOCUMENTS

| 7,818,456 | B2 | 10/2010 | Carro | |
|---|---|---|---|---|
| 2005/0289149 | A1* | 12/2005 | Carro | 707/10 |
| 2007/0136328 | A1* | 6/2007 | Carro | 707/100 |
| 2011/0072058 | A1* | 3/2011 | Tang et al. | 707/823 |
| 2012/0290625 | A1 | 11/2012 | Gies | |
| 2013/0304777 | A1* | 11/2013 | Bilinski et al. | 707/828 |
| 2014/0040286 | A1* | 2/2014 | Bane et al. | 707/754 |

FOREIGN PATENT DOCUMENTS

EP 2453367 A1 5/2012

OTHER PUBLICATIONS

IBM Corporation, Method to rename a mail attached file according to prefered language, Technical Disclosure IPCOM000181737D, Apr. 10, 2009, pp. 1-3, IP.com, Inc., Published online at: http://www.ip.com/pubview/IPCOM000181737D.

(Continued)

*Primary Examiner* — Ajith Jacob
(74) *Attorney, Agent, or Firm* — Lee Law, PLLC; Christopher B. Lee

(57) ABSTRACT

In response to detecting a file upload request of a file to a file repository, at least one filename metadata token that includes a subset of characters of a filename of the file is inferred using text analysis techniques. At least one inferred filename metadata token is extracted from the characters of the filename of the file, and is mapped to at least one repository upload processing action. The at least one repository upload processing action is executed in association with the file upload request of the file to the file repository.

7 Claims, 5 Drawing Sheets

(56) References Cited

OTHER PUBLICATIONS

IBM Corporation, System and method to create a meaningful file name for saving and publishing digital photographs online, Technical Disclosure IPCOM000180383D, Mar. 9, 2009, pp. 1-3, IP.com, Inc., Published online at: http://www.ip.com/pubview/IPCOM000180383D.

United States Patent and Trademark Office, Office Action for U.S. Appl. No. 13/942,796, Aug. 3, 2015, pp. 1-34, Alexandria, VA, USA.

United States Patent and Trademark Office, Office Action for U.S. Appl. No. 13/942,796, Jan. 20, 2016, pp. 1-34, Alexandria, VA, USA.

Ajith Jacob, Examiner, United States Patent and Trademark Office, Notice of Allowance for U.S. Appl. No. 13/942,769, Jun. 20, 2016, pp. 1-11, Alexandria, VA, USA.

\* cited by examiner

FILENAME-BASED INFERENCE OF REPOSITORY ACTIONS

RELATED CASES

This application is a continuation of and claims priority to and claims the benefit of U.S. patent application Ser. No. 13/942,769 titled "FILENAME-BASED INFERENCE OF REPOSITORY ACTIONS," which was filed in the United States Patent and Trademark Office on Jul. 16, 2013, and which is incorporated herein by reference in its entirety.

BACKGROUND

The present invention relates to filename management. More particularly, the present invention relates to filename-based inference of repository actions.

Files may be created by users using applications executed by computing devices. The files created by the users using the applications may include text-based, graphical, executable, and other forms of files. Files are named for storage with filenames specified by the user or users that create or update the files. Files may be stored locally on computing devices that execute the applications or may be stored remotely in file repositories.

BRIEF SUMMARY

A method includes inferring, using text analysis techniques by a processor in response to detecting a file upload request of a file to a file repository, at least one filename metadata token comprising a subset of characters of a filename of the file; extracting the at least one inferred filename metadata token from the characters of the filename of the file; mapping the extracted at least one inferred filename metadata token to at least one repository upload processing action; and executing the at least one repository upload processing action in association with the file upload request of the file to the file repository.

A system includes a file repository, and a processor programmed to: infer, using text analysis techniques in response to detecting a file upload request of a file to the file repository, at least one filename metadata token comprising a subset of characters of a filename of the file; extract the at least one inferred filename metadata token from the characters of the filename of the file; map the extracted at least one inferred filename metadata token to at least one repository upload processing action; and execute the at least one repository upload processing action in association with the file upload request of the file to the file repository.

A computer program product includes a computer readable storage medium having computer readable program code embodied therewith, where the computer readable program code when executed on a computer causes the computer to: infer, using text analysis techniques in response to detecting a file upload request of a file to a file repository, at least one filename metadata token comprising a subset of characters of a filename of the file; extract the at least one inferred filename metadata token from the characters of the filename of the file; map the extracted at least one inferred filename metadata token to at least one repository upload processing action; and execute the at least one repository upload processing action in association with the file upload request of the file to the file repository.

DETAILED DESCRIPTION

Figure 1:
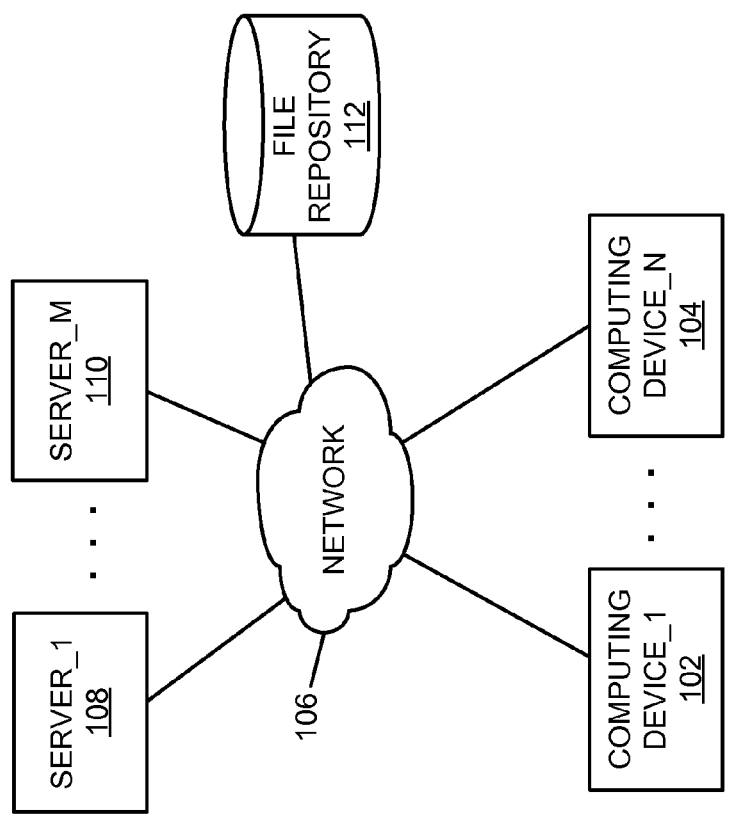
FIG. 1 is a block diagram of an example of an implementation of a system for filename-based inference of repository actions according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides filename-based inference of repository actions. File management within collaborative/social file editing and file development environments may be improved by performing configured actions based upon metadata that is inferred/implied in real time from characters of filenames during file uploads to and file downloads from a shared file repository. The filename-based inference of repository actions (alternatively "inferred repository actions" herein) may include file renaming and other configured processing actions performed in response to file uploads and file downloads. Inferred repository actions may include many forms of processing in addition to file renaming in response to file management activities, as described in more detail below. Complementary inferred repository actions may be configured for either or both of storage of files (e.g., file uploads) and retrieval of files (e.g., file downloads) from storage.

As a preliminary example, a configured inferred repository action of file renaming during file upload may be specified to identify "inferred metadata" within filenames (e.g., user-specific filename aspects), to extract the inferred metadata from a filename or contents of a file, and to store the file with the inferred metadata removed from the filename and associated with the file separately from the filename within the repository. In contrast, or as a complement, where a file is being retrieved from storage, an inferred repository action may include remapping the previously-inferred and extracted metadata, and adding the inferred metadata back to the filename so that the user may again recognize the file with the filename as designated by the user.

The extracted inferred metadata may be further mapped to other inferred repository actions as appropriate for a given implementation. The inferred repository action(s) may be executed to modify the filename and/or to perform other system actions, as described in more detail below. One or more inferred repository actions may be configured for file download operations that may be complementary to file upload inferred repository actions (e.g., add the user-specific filename aspects back to the filename). Additionally or alternatively, one or more inferred repository actions for download may be independent of file upload inferred repository actions.

Additional inferred repository actions beyond filename renaming may include many forms of processing in response to file management activities. For example, the inferred repository actions may include designated notification inferred repository actions to notify one or more users in response to file management activities, as described in more detail below. Additionally, versioning, user initial designations, user profile identifiers, organizational details, priority designations, date modifications, delegations details and controls, access control list permissions, sharing designations, draft status, and other inferred repository actions may all be performed. Further, the inferred repository actions may be performed in a bi-directional and complementary manner to perform the respective mappings as files are stored and retrieved, respectively.

To describe an example of the inferred repository actions on filenames, a filename such as "file1-v1Temp-jEdits.doc" will be used, where the portion of the filename "-v1Temp-jEdits" represents a user-designated filename extension. When such a file is stored, such as to a repository, the user-designated filename extension (e.g., "-v1Temp-jEdits") may be extracted as metadata from the filename. The file may be renamed to "file1.doc," and the metadata "-v1Temp-jEdits" may be stored in association with the renamed file. The metadata may be partitioned and stored as individual elements (e.g., "v1Temp," and "jEdits" may be separate metadata elements), or the metadata may be stored as a unified metadata element. Continuing with the same example, where the same user retrieves the stored file "file1.doc" from the repository, the inferred repository action may be implemented to rename the file for local use by the user to the original user-designated filename "file1-v1Temp-jEdits.doc."

It should be noted that the processing of bi-directional inferred repository actions of inferred metadata extraction and remapping for renaming files may be different for each user of a given file and may be specified by the users or organizations. Upon configuration, the bi-directional inferred repository actions of metadata extraction and remapping for renaming files may be performed without user intervention.

User preferences for inferred repository actions may be configured as user inferred repository action preferences, and may further be configured within a user inferred repository action profile, as appropriate for a given implementation. Additionally, learning algorithms and organizational inferred repository action policies (e.g., policies to be applied across an organization, department, etc.) may be utilized and configured to manage inferred repository action processing for both upload and download of files. Inferred repository action preferences/policies may be used to derive repository processing actions in real time based upon one or more filename metadata tokens inferred from a subset of characters of a filename of the file.

Further, regarding filename modification at file download, an inferred repository action preference/policy (e.g., individual or organizational) may be configured to, for example, limit the amount or number of the inferred metadata items that are placed/mapped into the filename. For example, inferred metadata addition to a filename may be limited to a version, owner, and date, where other elements of inferred metadata (e.g., organization name) are available. As such, where several elements of previously-inferred and extracted metadata are available, all or a portion of the inferred metadata may be mapped into the filename at download.

For purposes of the present description, the terms "upload" and "store" or "storage" will each represent an event of storage to a file system or repository. Similarly, the terms "download" and "retrieve" or "retrieval" will each represent an event of obtaining a stored file from a file system or repository.

The following initial examples are presented from a perspective of an inferential repository processing action module of a file sharing system that detects file upload and file download requests from multiple users. The inferential repository processing action module performs processing, as described above and in more detail below, in response to detecting the file upload and file download requests.

It should be understood that, while the initial description of certain example inferred repository actions below is presented with respect to file upload operations, the description of the example inferred repository actions below will serve as a basis for both upload and download inferred repository actions to avoid undue redundancy. It is understood that for any inferred repository action implemented for a file upload described below, complementary or alternative processing for file downloads may be performed, as appropriate for a given implementation and as appropriate for a given inferred repository action. Based upon file uploads and file downloads, the present technology presents files/filenames in the user's or organization's preferred user interface(s).

Regarding file upload operations, in response to detecting a file upload request, the inferential repository processing action module may make a determination as to whether the detected action is a file replacement action or whether the detected action is to store a new file that is being uploaded.

If the detected action is to replace the file, processing continues to replace the file. Conversely, if the detected action is to store a new file that is being uploaded, the inferential repository processing action module determines whether any related files already exist in the managed storage. If any related files already exist in the managed storage, the inferential repository processing action module presents the user with an option to merge the new uploaded file with an existing file.

The following analysis may be implemented by the inferential repository processing action module to identify and extract inferred metadata (e.g., alternatively referred to as "inferred tokens" or "inferred filename elements" herein) usable to find/identify related files and/or inferred tokens/metadata usable to modify a related file search scope used to identify related files. The inferential repository processing action module may analyze and extract inferred filename elements/tokens of the filename (e.g., "file1," "v1Temp," and "jEdits").

Further, regarding text analysis techniques, natural language processing techniques, regular expressions usable for pattern matching, custom/integrated text extraction routines, or other token/metadata extraction techniques may all be used to analyze text of filenames and to extract tokens/metadata from a filename. The filename may then be modified to remove the inferred metadata.

The extracted filename metadata tokens may then be mapped to inferred repository actions. To expand on the description above, where an inferred repository action includes a "designated notification inferred repository action" to notify one or more users in response to file management activities, a combination of initials and file sharing designations or file sharing permissions may be utilized by the inferential repository processing action module to notify one or more users of the action(s) taken by the file management actions.

Further, where an inferred repository action includes a "versioning inferred repository action," processing may be performed to modify a version number of the file in the repository (e.g., "v1," "version1," "v 3"). Where there is no change from the previous version number of the file, the version identifier is not incremented.

Where an inferred repository action includes a "user initial designation inferred repository action," processing may be performed to suggest adding an author or assigning authorship. The inferential repository processing action module may scan an online social network or collaboration list(s) (e.g., email groups/lists, etc.) or may scan a file management system to identify relevant initials (e.g., "jd" or other initials).

Where an inferred repository action includes a "user profile identifier inferred repository action," processing may be performed to automatically set one or more associated access control lists. The inferential repository processing action module may scan an online social network to identify the relevant profile networks (e.g., "jDoe").

Similarly, where an inferred repository action includes an "organizational detail inferred repository action," processing may be performed to assign files to folders or collections of files (e.g., "company name," etc.). Where an inferred repository action includes a "priority designation inferred repository action," processing may be performed to modify a sort priority in any view of files (e.g., "HIGH," "IMMEDIATE ACTION," etc.). Where an inferred repository action includes a "date modification inferred repository action," processing may be performed to modify a date (e.g., due date) or an edit date, or to modify a date format (e.g., "31MAR," "MAR31," "MARCH 31," "Q3," "1H," etc.). Where an inferred repository action includes a "delegations details and controls inferred repository action," processing may be performed to automatically add one or more user to a file access control list (e.g., "FOR jDoe"). Where an inferred repository action includes an "access control list permissions inferred repository action," processing may be performed to add one or more users to a file with a set access level. (e.g., "For Review," "review=reader," etc.). Where an inferred repository action includes a "sharing designation inferred repository action," processing may be performed to automatically add one or more users to an access control list (e.g., "Share with jDoe"). Where an inferred repository action includes a "draft status inferred repository action," processing may be performed to pause the versioning/revision operations, or to tentatively iterate a new version number (e.g., "DRAFT," "Final Draft," etc.). It should be understood that other forms of inferred repository actions that may be performed in response to file upload or download activities are possible, and all such inferred repository actions are considered within the scope of the present subject matter.

With the above description of several possible inferred repository actions, complementary file download operations will be described. It is understood that for the following description, complementary inferred repository actions may be performed. The description of the example inferred repository actions above is sufficient to allow description of complementary processing for file downloads.

Regarding file download operations, in response to detecting a file download request, the inferential repository processing action module may make a determination of any configured user or organization-preferred inferred repository actions to be applied to the file that is being downloaded. The inferential repository processing action module maps at least a subset of the previously-inferred and extracted metadata of the object into the filename. As described above, the inferential repository processing action module may utilize any configured limitations or selection operations to modify the filename as preferred by the user and/or within the respective organization, and all or a portion of the previously-inferred and extracted metadata may be mapped into the filename at download. The inferential repository processing action module modifies the name of the file that is downloaded, as configured by the respective preferences/profiles. The inferential repository processing action module provides the file with the modified filename and the file may be stored to local storage on a user computing device for use and editing within the user's or organization's preferred user interface/application.

It should be noted that if there is no existing metadata for the respective user's preference(s), the inferential repository processing action module may modify the download with "faux" or default entries. The default entries may be modified by the user to suit the user's preferences, and upon subsequent upload, metadata for the user may be inferred, extracted, and stored in association with the file for use during subsequent downloads of the file.

Further, in systems where caching is available and utilized, the inferential repository processing action module may default to the file owner, access control lists, or the organization's preferred inferred repository actions, as appropriate for a given implementation. In such an implementation, the inferential repository processing action module may automatically insert time elements into filenames in order to improve requests to the cache and cache management.

The inferential repository processing action module may further record or monitor download requests, and may recognize a situation where a user previously downloaded the same file they are requesting. In such a situation, the inferential repository processing action module may present the user with a message that indicates that the file was previously downloaded (e.g., "You previously downloaded this file as XYZ-v1.odt."). The user may be presented with an option to stop or continue the download.

Several additional configurable operations available for implementation of the present technology are described below. One configurable operation may include implementation of a policy and administration feature that controls access to the system. Additionally, a configurable operation may include implementation of security and privacy features that control the use of and access to the system. Another configurable operation may include implementation of machine learning techniques to extend the mapping of filename metadata to actions described above and in more detail below. Further, a configurable operation may include implementation of new or enhanced mappings of filename metadata to actions. Another configurable operation may include implementation of global language filename capabilities (e.g., filename capabilities for French Language, English Language, etc.). Further, a configurable operation may include implementing a built-in machine translation tool that may be utilized during translation of the filenames when the filename and version numbers are updated with a different language in the process. Another configurable operation may include implementation of a decision process for filename analysis for situations where a filename does not have any metadata to be inferred/extracted, and analyzing the document contents to imply and extract relevant details/metadata suitable for filename augmentation purposes. Another configurable operation may include implementation of inferred delegation features as part of the inferred repository action (e.g., delegate to a particular individual for further action). Further, a configurable operation may include implementation of a policy to configure storage durations for inferred/extracted metadata and expiration times for out-of-date metadata. An additional configurable operation may include modifying a view of the online file repository to show the user's inferred view preference rather than the stored filename with the metadata removed (e.g., User1 enters an initial version and title for a file and, within a view of the repository, that filename is shown). A further configurable operation may include making a change to the view based on the files that are uploaded by the user. The change to the view may be set based on the metadata as a one-time action, or the change to the view may be continuously revisited as new files are uploaded (e.g., one time or dependent on the changes of file names in the system). Another configurable operation may include operations to execute inferred repository actions "on demand," "asynchronously," "synchronously," or in a batch mode. Additionally, a configurable operation may include enabling application entry points for other applications to utilize inferred/extracted metadata on behalf of another user, such as for example, enabling an entry point for a customer relationship management (CRM) system to access files, and providing the files named using the preferred view(s) of the user(s) of the CRM systems. Another configurable operation may include executing inferred repository actions automatically, or prompting the user to confirm execution of the inferred repository actions and executing the inferred repository actions in response to confirmation by the user. An additional configurable operation may include identifying a state of the document in a document lifecycle as part of inferred metadata processing. Additionally, a configurable operation may include implementation of a confidential flag and implementation of dynamic security.

As can be seen from the description above, many configurable operations may be implemented. Each configurable operation may be combined and/or configured together with other configurable operations, or may be implemented and/or configured separately, as appropriate for a given implementation. Many other configurable operations are possible and all such configurable operations are considered within the scope of the present subject matter.

It should be noted that conception of the present subject matter resulted from recognition of certain limitations associated with conventional filename management. For example, it was observed that increased use of online file repositories and increased online collaboration has resulted in a significant increase in files/entries stored within online repositories. Additionally, it was observed that, while users collaborate within business processes using the stored files/entries, the stored files/entries as named within the repositories are not correlated with the ad-hoc workflow state of the collaborating users, and do not represent a current state of a business process used by the users. Further, it was observed that the lack of correlation is compounded where individual files have multiple versions or iterations within the repositories that are each named differently by different users, and that information that does not add value to business processing is often captured within stored filenames. It was additionally observed that discrepancies between in-file metadata or document management system version information and filename version information designated by a user result from user filename manipulation. For example, it was observed that a conventional document management system may indicate a file is at version one (1), while the filename specified by a user may be named such as "filename_usernameEdits_v2.doc." It was further observed that multiple instances of the same file may be stored in a repository as a result of user naming inconsistencies and that such redundancy unnecessarily decreases storage capacity for such repositories. In view of these several observations it was determined that a unified approach to abstraction of filename information with filename modification for storage, with complementary filename modification for usage/editing using the abstracted filename information, would improve repository filename management and filename correlation with business processes and user collaboration. The present subject matter improves repository filename management by providing for filename-based inference of repository actions, as described above and in more detail below. As such, improved repository utility and filename correlation with user file manipulations may be obtained through use of the present technology.

The filename-based inference of repository actions described herein may be performed in real time to allow prompt bi-directional upload and download inferred metadata identification, extraction, and abstraction, and bi-directional filename modifications based upon the inferred metadata. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for filename-based inference of repository actions. A computing device_1 102 through a computing device_N 104 communicate via a network 106 with several other devices. The other devices include a server_1 108 through a server_M 110 and a file repository 112. The file repository 112 may include one or more physical devices that may be self-managed file server type devices, and, as such, may include one or more stand-alone or distributed file repositories. Additionally or alternatively, the file repository 112 may be managed by one or more of the server_1 108 through the server_M 110, as appropriate for a given implementation. Any of the devices shown within FIG. 1 may implement and participate according to a file sharing system usable as described above and in more detail below for filename-based inference of repository actions.

As will be described in more detail below in association with FIG. 2 through FIG. 4B, the computing device_1 102 through the computing device_N 104, the server_1 108 through the server_M 110, and the file repository 112 (where configured as a repository and file server) may each provide automated filename-based inference of repository actions. The automated filename-based inference of repository actions is based upon bi-directional upload and download inferred metadata identification, extraction, and abstraction, and bi-directional filename modifications based upon the inferred/inferred metadata tokens. As such, the present technology may be implemented at a user computing device or server device level, as appropriate for a given implementation. A variety of possibilities exist for implementation of the present subject matter, and all such possibilities are considered within the scope of the present subject matter.

To further elaborate on example granularities of subsystems of the system 100, one or more system users may be configured within the system 100 as "owners" or "managers" of a file or file set, and other system users/participants may be configured as "users" of the file or file set. Further, one or more of the server_1 108 through the server_M 110, and/or the file repository 112, may be configured as a file sharing subsystem/service accessible by the system users. The same or another of the server_1 108 through the server_M 110 may be configured as a social network subsystem that manages users within the system 100 and allows collaboration and network interaction among the system users. A filename modification subsystem or module may be configured to process bi-directional filename modification and other inferred repository actions on behalf of the system users. The filename modification subsystem or module may further include a storage subsystem or interface with a storage subsystem (e.g., the file repository 112) that stores file sharing models and parameters usable to implement the present technology, and may also include a notification subsystem that notifies users of the social network of any implemented file sharing changes. Many other possibilities for granular partitioning of functionality are possible, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The file repository 112 may include a local or remote file server, network attached storage, or any other storage type of device. As such, the file repository 112 may be implemented as appropriate for a given implementation.

Figure 2:
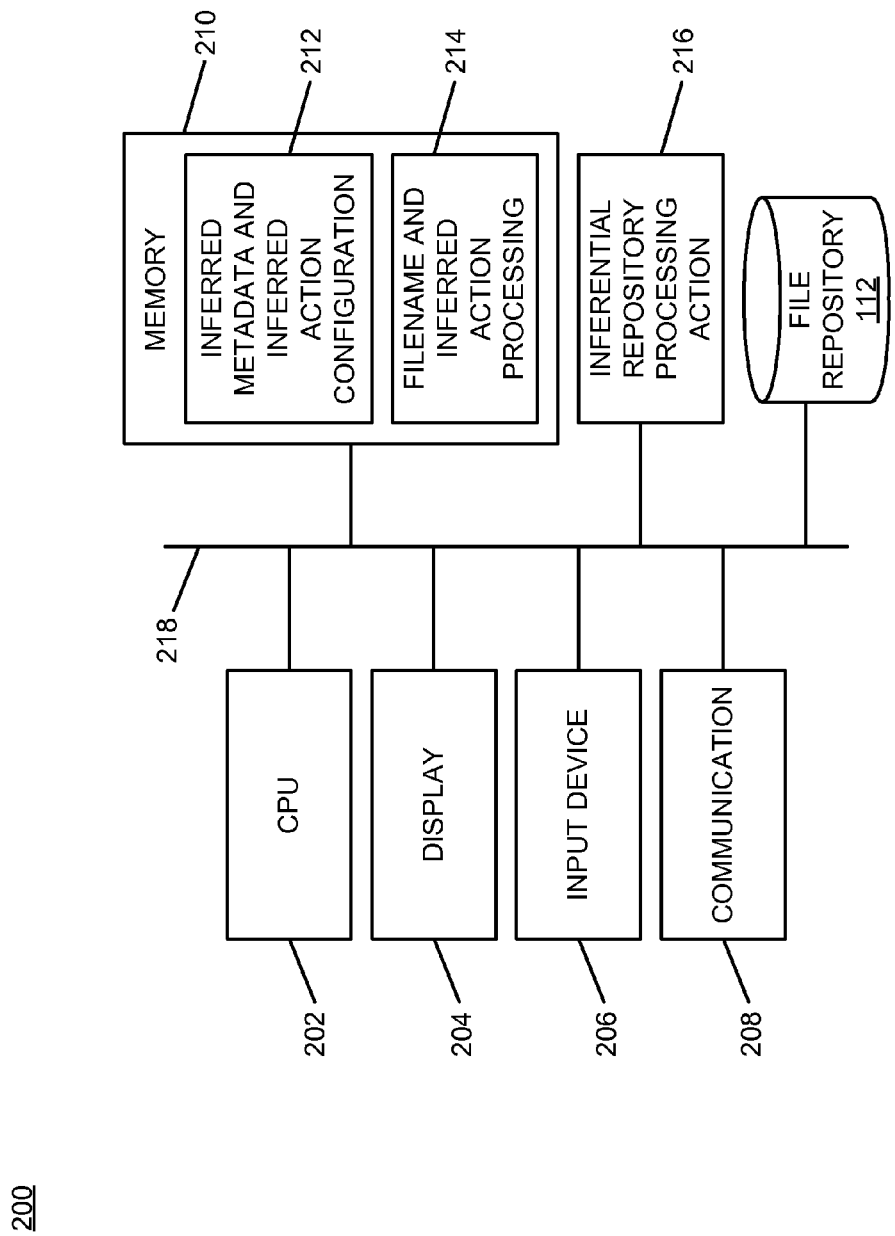
FIG. 2 is a block diagram of an example of an implementation of a core processing module capable of performing filename-based inference of repository actions according to an embodiment of the present subject matter.

FIG. 2 is a block diagram of an example of an implementation of a core processing module 200 capable of performing filename-based inference of repository actions. The core processing module 200 may be associated with either the computing device_1 102 through the computing device_N 104, with the server_1 108 through the server_M 110, or with the file repository 112, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of upload and download filename modifications based upon inferred metadata, and may provide different and complementary processing of inferred repository actions based upon the inferred metadata, in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes an inferred metadata and inferred action configuration storage area 212 that stores preferences and profiles (e.g., user and/or organizational preferences and profiles) for upload and download filename modification, and other configuration information within the core processing module 200. A filename and inferred action processing storage area 214 provides storage for extracted inferred/implied file metadata, for processing of configured inferred repository actions, and for modification of filenames in association with upload and download operations.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An inferred repository processing action module 216 is also illustrated. The inferred repository processing action module 216 provides metadata/token identification and extraction from filenames during file upload operations, and infers repository actions to be performed based upon the extracted metadata/tokens. The inferred repository processing action module 216 also provides inferred/token metadata mapping and insertion back into filenames during file download operations, and infers repository actions to be performed based upon the re-inserted metadata/tokens. The inferred repository processing action module 216 implements the automated filename-based inference of repository actions of the core processing module 200.

It should also be noted that the inferred repository processing action module 216 may form a portion of other circuitry described without departure from the scope of the present subject matter. Further, the inferred repository processing action module 216 may alternatively be implemented as an application stored within the memory 210. In such an implementation, the inferred repository processing action module 216 may include instructions executed by the CPU 202 for performing the functionality described herein. The CPU 202 may execute these instructions to provide the processing capabilities described above and in more detail below for the core processing module 200. The inferred repository processing action module 216 may form a portion of an interrupt service routine (ISR), a portion of an operating system, a portion of a browser application, or a portion of a separate application without departure from the scope of the present subject matter.

The file repository 112 is again shown within FIG. 2 associated with the core processing module 200. As such, the file repository 112 may be operatively coupled to the core processing module 200 without use of network connectivity, as appropriate for a given implementation.

The CPU 202, the display 204, the input device 206, the communication module 208, the memory 210, the inferred repository processing action module 216, and the file repository 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the file repository 112 is illustrated as a separate component for purposes of example, the information stored within the file repository 112 may also/alternatively be stored within the memory 210 without departure from the scope of the present subject matter. Accordingly, the core processing module 200 may take many forms and may be associated with many platforms.

Figure 3:
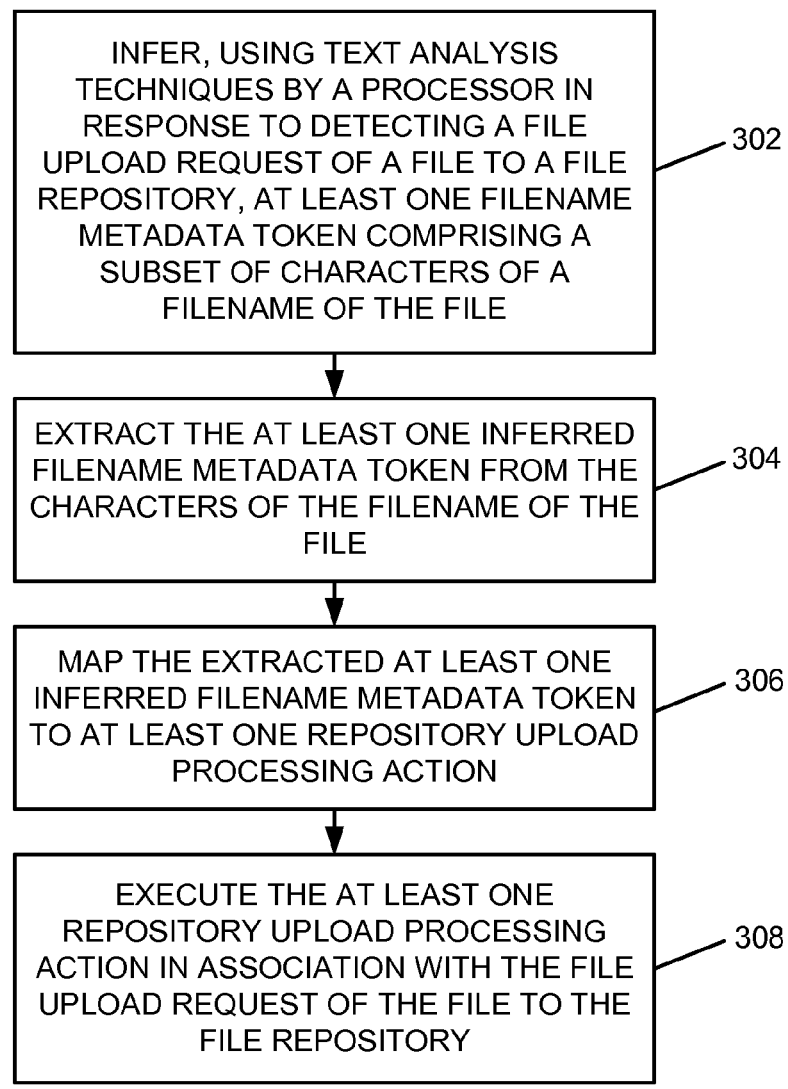
FIG. 3 is a flow chart of an example of an implementation of a process for filename-based inference of repository actions according to an embodiment of the present subject matter.
Figure 4A:
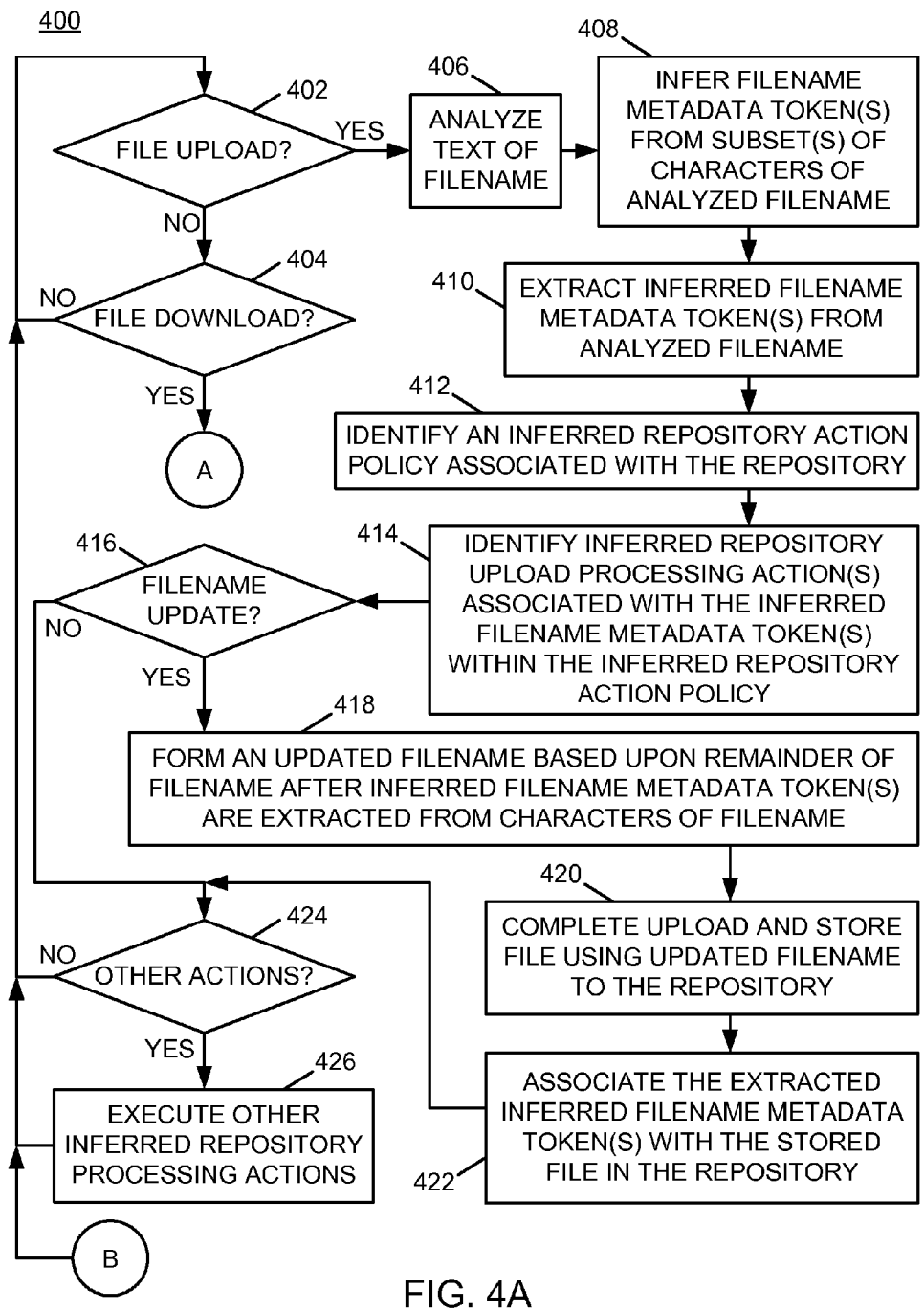
FIG. 4A is a flow chart of an example of an implementation of initial processing within a process for filename-based inference of repository actions based upon file uploads and file downloads according to an embodiment of the present subject matter.
Figure 4B:
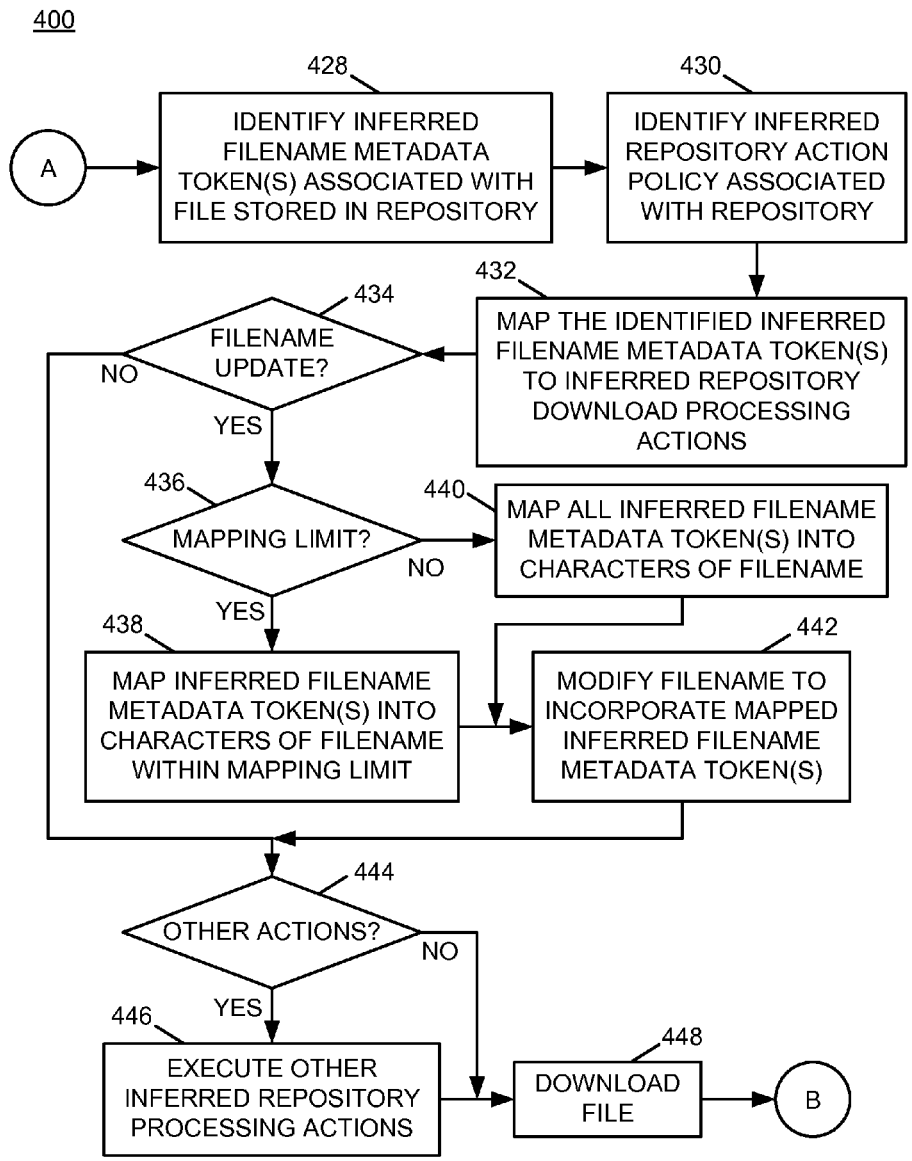
FIG. 4B is a flow chart of an example of an implementation of additional processing within a process for filename-based inference of repository actions based upon file uploads and file downloads according to an embodiment of the present subject matter.

FIG. 3 through FIG. 4B described below represent example processes that may be executed by devices, such as the core processing module 200, to perform the automated filename-based inference of repository actions associated with the present subject matter. Many other variations on the example processes are possible and all are considered within the scope of the present subject matter. The example processes may be performed by modules, such as the inferred repository processing action module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for filename-based inference of repository actions. At block 302, the process 300 infers, using text analysis techniques by a processor in response to detecting a file upload request of a file to a file repository, at least one filename metadata token comprising a subset of characters of a filename of the file. At block 304, the process 300 extracts the at least one inferred filename metadata token from the characters of the filename of the file. At block 306, the process 300 maps the extracted at least one inferred filename metadata token to at least one repository upload processing action. At block 308, the process 300 executes the at least one repository upload processing action in association with the file upload request of the file to the file repository.

FIGS. 4A-4B illustrate a flow chart of an example of an implementation of process 400 for filename-based inference of repository actions based upon file uploads and file downloads. FIG. 4A illustrates initial processing within the process 400. At decision point 402, the process 400 makes a determination as to whether a file upload operation has been detected, such as a file upload to the file repository 112. In response to determining that a file upload operation has not been detected at decision point 402, the process 400 makes a determination at decision point 404 as to whether a file download operation has been detected, such as a file download from the file repository 112. In response to determining that a file download operation has not been detected at decision point 404, the process 400 returns to decision point 402 and iterates as described above.

Returning to the description of decision point 402, in response to determining that a file upload operation has been detected, the process 400 analyzes text of the filename using text analysis techniques at block 406. As described above, text analysis techniques such as natural language processing techniques, regular expressions usable for pattern matching, and custom/integrated text extraction routines, or other token/metadata extraction techniques may all be used to analyze text of filenames and to extract tokens/metadata from a filename.

At block 408, the process 400 infers one or more filename metadata tokens from one or more subsets of characters of the analyzed filename. At block 410, the process 400 extracts at least one inferred filename metadata token from the characters of a filename of the file. At block 412, the process 400 identifies an inferred repository action policy associated with the repository. It should be noted that the inferred repository action policy may be partitioned into one or more policies, such as an inferred repository action upload policy and an inferred repository action download policy. Where an inferred repository action policy is partitioned, the processing at block 412 may identify an inferred repository action upload policy.

At block 414, the process 400 identifies one or more inferred repository upload processing actions associated with the extracted inferred filename metadata token(s) within the respective inferred repository action policy. The one or more inferred repository upload actions may include, for example, an action to at least one of create and update metadata with file version information, user initials, a user profile identifier, an organizational profile identifier, an action priority, a date, delegation details, access control lists permissions, a file sharing designation, a draft status, a notification, or other metadata associated with a repository, as appropriate for a given implementation.

At decision point 416, the process 400 makes a determination as to whether a filename update is included in the one or more inferred repository upload processing actions. In response to determining that a filename update is included in the one or more inferred repository upload processing actions, the process 400 forms an updated filename based upon a remainder of the filename after at least one inferred filename metadata token is extracted from the characters of the filename at block 418. At block 420, the process 400 completes the file upload and stores the file using the updated filename to the file repository. At block 422, the process 400 associates the extracted at least one inferred filename metadata token with the stored file in the repository. As such, the filename may be modified to extract the metadata tokens and the metadata tokens may be preserved in association with the file within the repository.

In response to completing the association of the extracted at least one inferred filename metadata token with the stored file in the repository at block 422, or in response to determining at decision point 416 that a filename update is not included in the one or more inferred repository upload processing actions, the process 400 makes a determination at decision point 424 as to whether one or more other inferred repository actions are configured to be executed in association with the file upload operation. As described above, the additional inferred repository actions may include, for example, creating and/or updating metadata with file version information, user initials, a user profile identifier, an organizational profile identifier, an action priority, a date, delegation details, access control lists permissions, a file sharing designation, a draft status, a notification, or other metadata associated with a repository, as appropriate for a given implementation.

In response to determining at decision point 424 that one or more other inferred repository actions are configured to be executed in association with the file upload operation, the process 400 executes the other configured inferred repository actions at block 426. To conserve drawing space, decision points for and processing of each of these example actions are not individually listed, but are understood to form a portion of the processing shown within FIG. 4A at block 426.

In response to executing the other configured inferred repository actions at block 426, or in response to determining at decision point 424 that no other inferred repository actions are configured to be executed in association with the file upload operation, the process 400 returns to decision point 402 and iterates as described above.

Returning to the description of decision point 404, in response to determining that a file download operation has been detected, such as a file download request of the file from the file repository 112, the process 400 transitions to the processing shown and described in association with FIG. 4B.

FIG. 4B illustrates additional processing associated with the process 400 for filename-based inference of repository actions based upon file uploads and file downloads. At block 428, the process 400 identifies at least one inferred filename metadata token associated with the file stored in the file repository. At block 430, the process 400 identifies an inferred repository action policy associated with the repository. As noted above, the inferred repository action policy may be partitioned into one or more policies, such as an inferred repository action upload policy and an inferred repository action download policy. Where an inferred repository action policy is partitioned, the processing at block 430 may identify an inferred repository action download policy.

At block 432, the process 400 maps the identified at least one inferred filename metadata token associated with the file in the file repository to at least one inferred repository download processing action. As with upload processing, the inferred repository download actions may include, for example, an action to at least one of identify and map metadata associated with file version information, user initials, a user profile identifier, an organizational profile identifier, an action priority, a date, delegation details, access control lists permissions, a file sharing designation, a draft status, a notification, or other metadata associated with a repository, as appropriate for a given implementation.

At decision point 434, the process 400 makes a determination as to whether a filename update is included in the one or more inferred repository download processing actions. In response to determining that a filename update is included in the one or more inferred repository download processing actions, the process 400 makes a determination at decision point 436, for example from the identified inferred repository action policy, as to whether a limitation on mapping of the inferred filename metadata token(s) into the filename has been configured. For example, a filename length limitation or a configured number of metadata tokens to be mapped into the filename of the file during download may be configured. Further, such limitations may be configured for individual users or organizations (e.g., per department), or otherwise configured as appropriate for a given implementation.

In response to determining that a limitation on mapping of the inferred filename metadata token(s) into the filename has been configured at decision point 436, the process 400 maps the inferred filename metadata token(s) into the filename of the file within any configured limitation(s) on the mapping of the inferred filename metadata token to place into the filename at block 438. In response to determining that a limitation on mapping of the inferred filename metadata token(s) into the filename has not been configured at decision point 436, the process 400 maps all of the inferred filename metadata token(s) into the filename at block 440. In response to completion of the respective inferred metadata token mapping into the filename at one of blocks 438 and 440, the process 400 modifies the filename to incorporate the mapped inferred filename metadata token(s) at block 442.

In response to modifying the filename to incorporate the mapped inferred filename metadata token(s) at block 442, or in response to determining at decision point 434 that a filename update is not included in one or more inferred repository download processing actions, the process 400 makes a determination at decision point 444 as to whether one or more other inferred repository actions are configured to be executed in association with the file download operation. As described above, the additional inferred repository actions may include, for example, identifying and/or mapping metadata associated with file version information, user initials, a user profile identifier, an organizational profile identifier, an action priority, a date, delegation details, access control lists permissions, a file sharing designation, a draft status, a notification, or other metadata associated with a repository, as appropriate for a given implementation.

In response to determining at decision point 444 that one or more other inferred repository actions are configured to be executed in association with the file download operation, the process 400 executes the other configured inferred repository actions at block 446. To conserve drawing space, decision points for and processing of each of these example actions are not individually listed, but are understood to form a portion of the processing shown within FIG. 4B at block 446.

In response to executing the other configured inferred repository actions at block 446, or in response to determining at decision point 444 that no other inferred repository actions are configured to be executed in association with the file download operation, the process 400 downloads the file at block 448. It should be noted that the file may be downloaded with the modified filename if modified by the one or more inferred repository processing actions or may be downloaded with the filename as stored within the repository. The process 400 returns to the processing described in association with FIG. 4A above at decision point 402 and iterates as described above.

As such, the process 400 processes both file upload and file download operations for a file repository. The process 400 infers metadata from subsets of characters of a filename of the file during upload processing. The inferred metadata is removed from the filename and stored in association with the file in the repository and the inferred metadata may invoke a variety of inferred repository processing upload actions. In response to a download operation, the inferred metadata may be mapped back into the filename so that the user again sees the same filename used by the user at the time of upload. The inferred metadata may again be used during download to invoke a variety of inferred repository processing download actions. The variety of inferred repository processing download actions may be complementary to or independent of the variety of inferred repository processing upload actions.

As described above in association with FIG. 1 through FIG. 4B, the example systems and processes provide filename-based inference of repository actions. Many other variations and additional activities associated with filename-based inference of repository actions are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    inferring, using text analysis techniques by a processor in response to detecting a file upload request of a file to storage within a file repository, at least one filename metadata token each comprising a subset of characters of a filename of the file and each mapped in association with the file repository using the subset of characters to at least one repository upload processing action of the file repository;
    identifying, using the subset of characters of each of the at least one inferred filename metadata token, each mapped repository upload processing action; and
    executing each mapped repository upload processing action identified using the subset of characters of each of the at least one inferred filename metadata token in association with the file upload request of the file to the storage within the file repository.

2. The method of claim 1, where identifying, using the subset of characters of each of the at least one inferred filename metadata token, each mapped repository upload processing action comprises:
identifying an inferred repository action policy associated with the file repository; and
identifying each mapped repository upload processing action associated with the subset of characters of each of the at least one inferred filename metadata token within the inferred repository action policy.

3. The method of claim 1, where executing each mapped repository upload processing action identified using the subset of characters of each of the at least one inferred filename metadata token in association with the file upload request of the file to the storage within the file repository comprises:
forming, for storage of the file in the file repository, an updated filename based upon a remainder of the filename with the at least one inferred filename metadata token removed from the characters of the filename;
storing the file using the updated filename with the at least one inferred filename metadata token removed from the characters of the filename to the file repository; and
associating the removed at least one inferred filename metadata token with the stored file as repository metadata of the file in the repository.

4. The method of claim 1, where the at least one repository upload processing action comprises an action to at least one of create and update metadata selected from a group consisting of:
file version information, user initials, a user profile identifier, an organizational profile identifier, an action priority, a date, delegation details, access control lists permissions, a file sharing designation, a draft status, and a notification.

5. The method of claim 1, further comprising:
detecting a file download request of a file stored in the file repository;
identifying at least one inferred filename metadata token associated with the file stored in the file repository;
identifying, using characters of the identified at least one inferred filename metadata token associated with the file stored in the file repository at least one mapped repository download processing action; and
executing the at least mapped one repository download processing action in association with the file download request of the file stored in the file repository.

6. The method of claim 5, where executing the at least one mapped repository download processing action in association with the file download request of the file stored in the file repository comprises:
mapping the identified at least one inferred filename metadata token into characters of a filename of the file;
modifying the filename of the file to incorporate the mapped at least one inferred filename metadata token into the characters of the filename of the file; and
sending the file from the file repository with the modified filename in response to the detected file download request.

7. The method of claim 6, where mapping the identified at least one inferred filename metadata token into the characters of the filename of the file comprises:
identifying an inferred repository action policy associated with the file repository;
determining at least one limitation on the inclusion of the identified at least one inferred filename metadata token into the characters of the filename of the file from the identified inferred repository action policy;
mapping the identified at least one inferred filename metadata token into the characters of the filename of the file within the determined at least one limitation; and
modifying the filename to incorporate the mapped at least one inferred filename metadata token into the characters of the filename of the file.

* * * * *